(12) United States Patent
Chang

(10) Patent No.: US 6,230,586 B1
(45) Date of Patent: May 15, 2001

(54) ELECTRIC DRIVE DEVICE FOR A BICYCLE

(76) Inventor: Chung-Hsi Chang, No. 41-1, Hsi Liau Lane, Yuan lu Rd. Hsi Hu Chen, Changhwa Hsien (TW)

( * ) Notice: Subject to any disclaimer, the term of this patent is extended or adjusted under 35 U.S.C. 154(b) by 0 days.

(21) Appl. No.: 09/316,816

(22) Filed: May 21, 1999

(51) Int. Cl.[7] ............................. F16H 33/00; B62K 11/00

(52) U.S. Cl. ............................. 74/625; 180/206; 180/220

(58) Field of Search ................................. 180/206, 220; 74/625, 640, 650, 670

(56) References Cited

U.S. PATENT DOCUMENTS

| | | | | |
|---|---|---|---|---|
| 5,570,752 | * | 11/1996 | Takata ................................... | 180/206 |
| 5,829,546 | * | 11/1998 | Tseng ................................... | 180/206 |
| 5,845,727 | * | 12/1998 | Miyazawa et al. ................... | 180/205 |
| 5,901,807 | * | 5/1999 | Tseng ................................... | 180/206 |
| 5,937,964 | * | 8/1999 | Mayer et al. ......................... | 180/220 |

FOREIGN PATENT DOCUMENTS 0-907379 * 4/1999 (EP) .

* cited by examiner

Primary Examiner—Sherry Estremsky
Assistant Examiner—Tisha D. Lewis
(74) Attorney, Agent, or Firm—Gardere Wynne Sewell LLP; Sanford E. Warren, Jr.

(57) ABSTRACT

An electric drive device for a bicycle includes a motor connected to a speed reduction device which has a bevel gear engaged with an annular gear mounted to a rotatable tube that extends through the bottom bracket of the bicycle frame. A crank axle rotatably extends through the rotatable tube with a first unidirectional device connected between the crank axle and the rotatable tube. The annular gear has a plurality of notches defined in the inside thereof and a second unidirectional device is connected between the annular gear and the rotatable tube. The second unidirectional device has a socket with a plurality of pawls pivotally connected thereto which are engaged with the notches when the motor is actuated to drive the rotatable tube while the first unidirectional device releases the connection between the crank axle and the rotatable tube.

4 Claims, 5 Drawing Sheets

ELECTRIC DRIVE DEVICE FOR A BICYCLE

FIELD OF THE INVENTION

The present invention relates to an electric drive device for a bicycle, and the device comprising a first unidirectional means connected between a rotatable tube and a drive gear, and a second unidirectional means connected between the rotatable tube and a crank axle in the rotatable tube.

BACKGROUND OF THE INVENTION

A conventional electric bicycle uses a motor to drive the sprocket mounted to the crank axle and a chain connected between the sprocket and the rear wheel sprocket so that when the sprocket is rotated by the motor, the rear sprocket is rotated by the chain and the bicycle moves forward. Although the motor provides the mechanical force to assist the rider to power the bicycle, the rider's feet on the pedals of the crank have to rotate with the rotation of the crank. This is inconvenient for some older riders, and when the rotational speed of the crank is raised, the rider will feel uncomfortable and unsafe because they feel that the bicycle cannot be well controlled by them. Furthermore, the rider's feet rotating with the crank makes the rider feel tired within a short period of time of operation.

The present invention intends to provide an electric drive device for a bicycle wherein the crank will not rotate with the rotatable tube when the bicycle is powered by the motor so that the shortcoming mentioned above can be resolved.

SUMMARY OF THE INVENTION

In accordance with one aspect of the present invention, an electric drive device for a bicycle comprises a motor having a drive shaft with a first gear mounted to the shaft. A speed reduction device has an output shaft with a second gear mounted to the output shaft. The second gear is engaged with the first gear. A bevel gear is connected to the distal end of the output shaft and engaged with an annular gear.

A rotatable tube extends through the bottom bracket of the bicycle and a crank axle rotatably extends through the rotatable tube. The annular gear is mounted to the rotatable tube, and a first unidirectional means is connected between the rotatable tube and the annular gear. The annular gear is engaged with the bevel gear and has a plurality of notches defined in the inside thereof.

The first unidirectional means has a socket and a plurality of pawls pivotally connected to the outside of the socket. The pawls are disengagably engaged with the notches when the motor is actuated to rotate the rotatable tube.

A second unidirectional means is connected between the crank axle and the rotatable tube so that when the rotatable tube is rotated by the first unidirectional means, the crank axle is disengaged with the rotatable tube by the second unidirectional means.

The main object of the present invention is to provide an electric drive device for a bicycle wherein the device occupies a limited space so that the configuration of the bicycle frame changes very few.

Another object of the present invention is to provide an electric drive device for a bicycle wherein the rider's feet need not rotate with the crank when the bicycle is powered by the motor.

Further objects, advantages, and features of the present invention will become apparent from the following detailed description with appropriate reference to the accompanying drawings.

DETAILED DESCRIPTION OF THE PREFERRED EMBODIMENT

Figure 1:
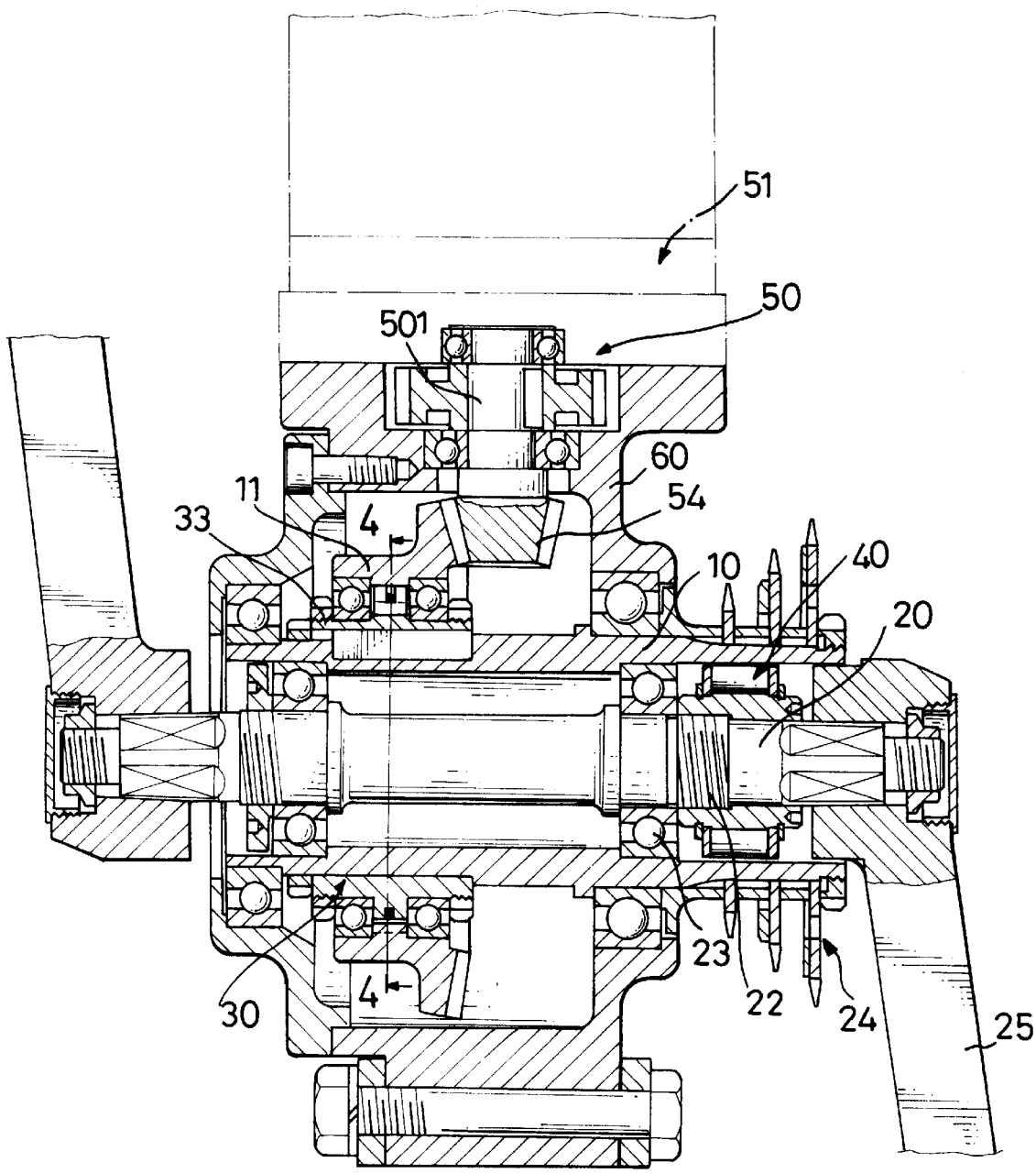
FIG. 1 is a front elevational view, partly in section, of the drive device in accordance with the present invention connected to the bicycle frame.
Figure 2:
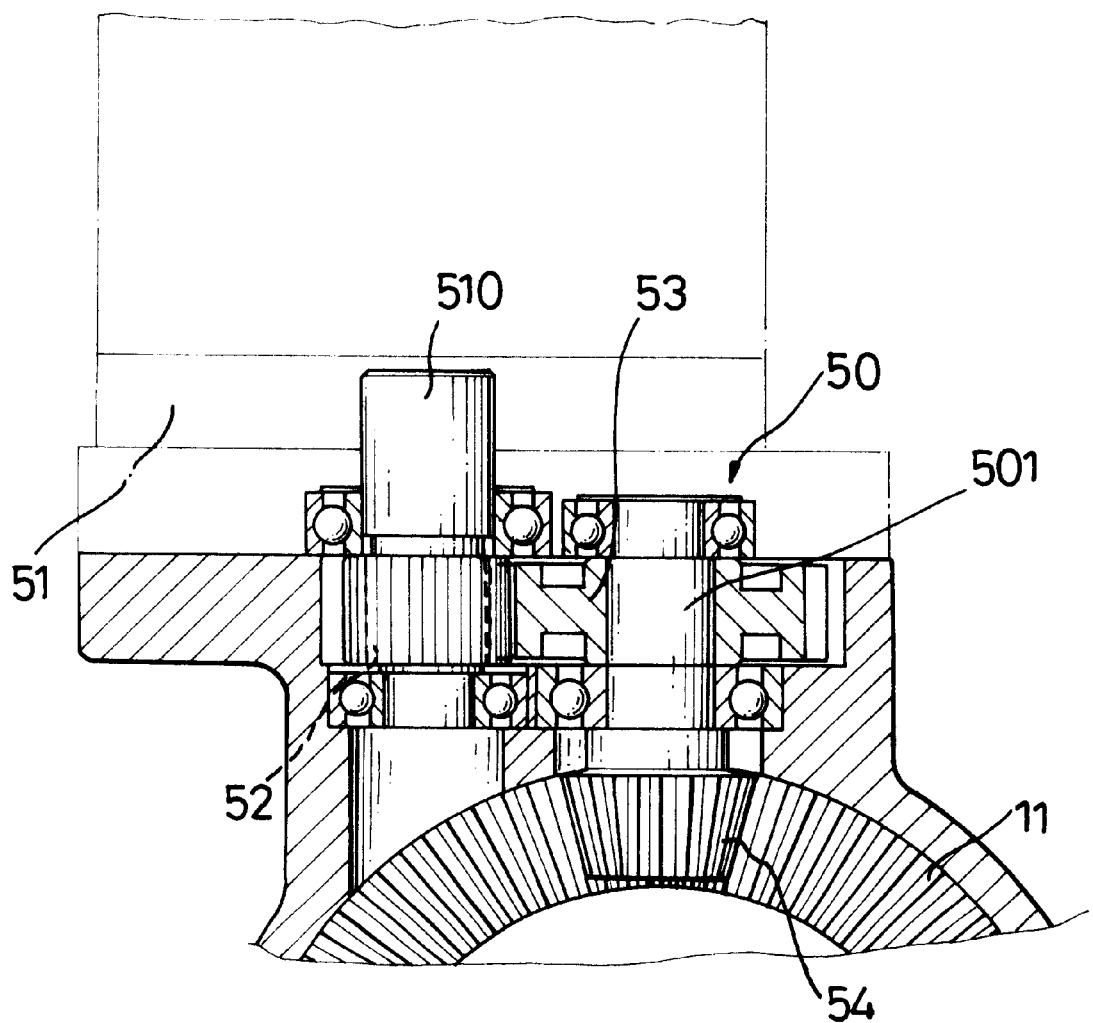
FIG. 2 is a front elevational view, partly in section, of the arrangement of the motor and the speed reduction device of the drive device in accordance with the present invention.
Figure 3:
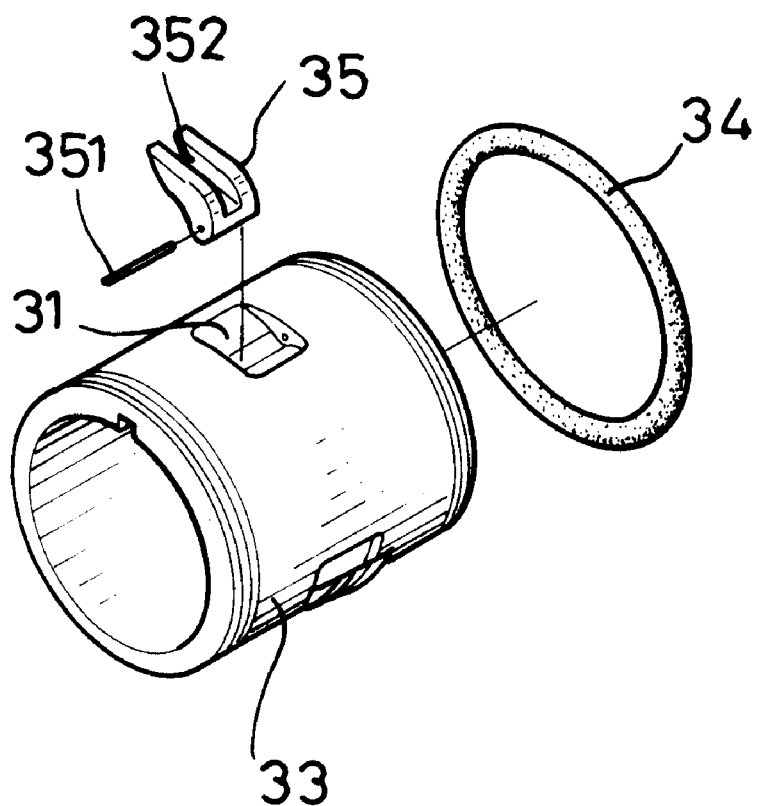
FIG. 3 is a perspective view to show the socket and the pawls of the first unidirectional means of the drive device in accordance with the present invention.

Referring to FIGS. 1 to 3, the electric drive device for a bicycle in accordance with the present invention comprises a motor (51) having a drive shaft (510) extending therefrom and a first gear (52) mounted to the shaft (510). A speed reduction device (50) is connected to the lower end of the motor (51) and has an output shaft (501) extending therefrom. A second gear (53) is mounted to the output shaft (501) and engaged with the first gear (52). The output shaft (501) has a bevel gear (54) connected to the distal end thereof.

A rotatable tube (10) rotatably extends through the bottom bracket (60) of the bicycle and a crank axle (20) rotatably extends through the rotatable tube (10). Two cranks (25) are fixedly connected to the two ends of the crank axle (20) so that when rotating the two cranks (25), the crank axle (20) rotates. Three sprockets (24) are fixedly mounted to one of two ends of the rotatable tube (10).

Figure 4:
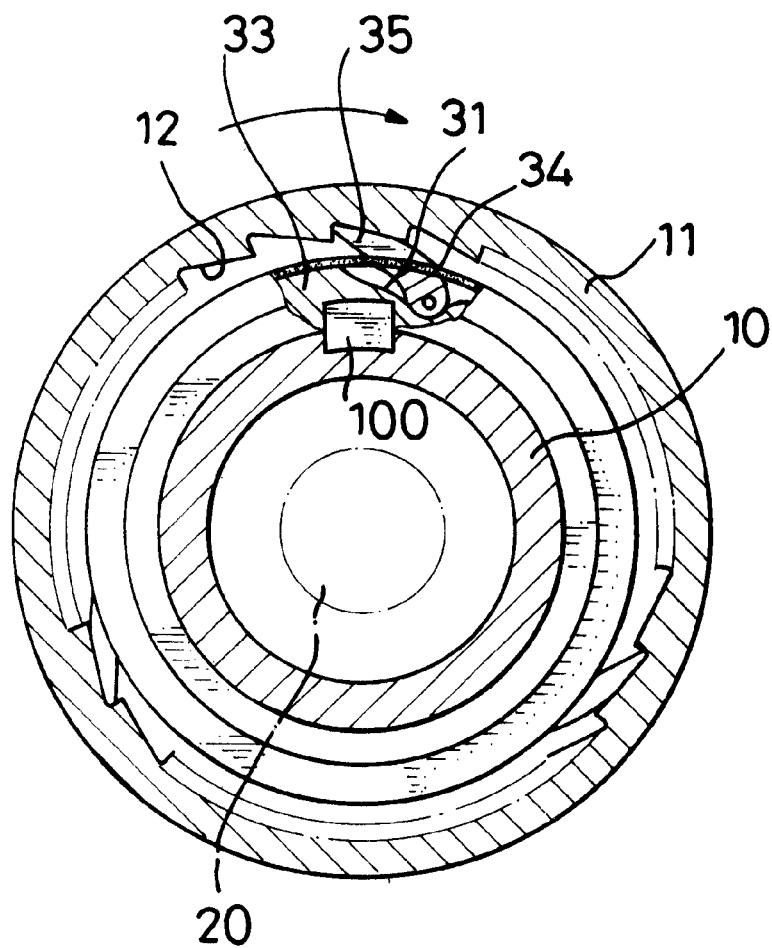
FIG. 4 is a side elevational view, partly in section, of the first unidirectional means to connect the rotatable tube and the annular gear when the motor is actuated.

An annular gear (11) is mounted to the rotatable tube (10) and a first unidirectional means (30) is connected between the rotatable tube (10) and the annular gear (11). The annular gear (11) is engaged with the bevel gear (54) and has a plurality of notches (12) (FIG. 4) defined in the inside thereof. Further referring to FIG. 3, the first unidirectional means (30) includes a socket (33) which has a plurality of recesses (31) defined radially in the outside thereof and pawls (35) respectively and pivotally received in the recesses (31). The socket (33) is fixedly connected to the rotatable tube (10) by a key (100) as shown in FIG. 4. The first end of each pawl (35) is pivotally engaged with the recess (31) corresponding thereto by a pin (351) and the second end of each pawl (35) has a slit (352) defined longitudinally therein. A circular ring (34) is mounted to the socket (33) and received in the slit (352) of each pawl (35) so that the pawls (35) are normally engaged with the notches (12) and when the annular gear (11) is rotated clockwise as shown in FIG. 4, the socket (33) and the rotatable tube (10) are co-rotated with the annular gear (11).

A second unidirectional means (40) is threaded to a threaded section (22) defined in the crank axle (20) and located between the crank axle (20) and the rotatable tube (10). The crank axle (20) is disengaged with the rotatable tube (10) by the second unidirectional means (40) when the rotatable tube (10) is rotated by the first unidirectional means (30). In other words, when the bicycle is powered by the motor (51), the rotatable tube (10) and the sprockets (24) are rotated while the crank axle (20) is still so that the rider's feet do not need to rotate.

Figure 5:
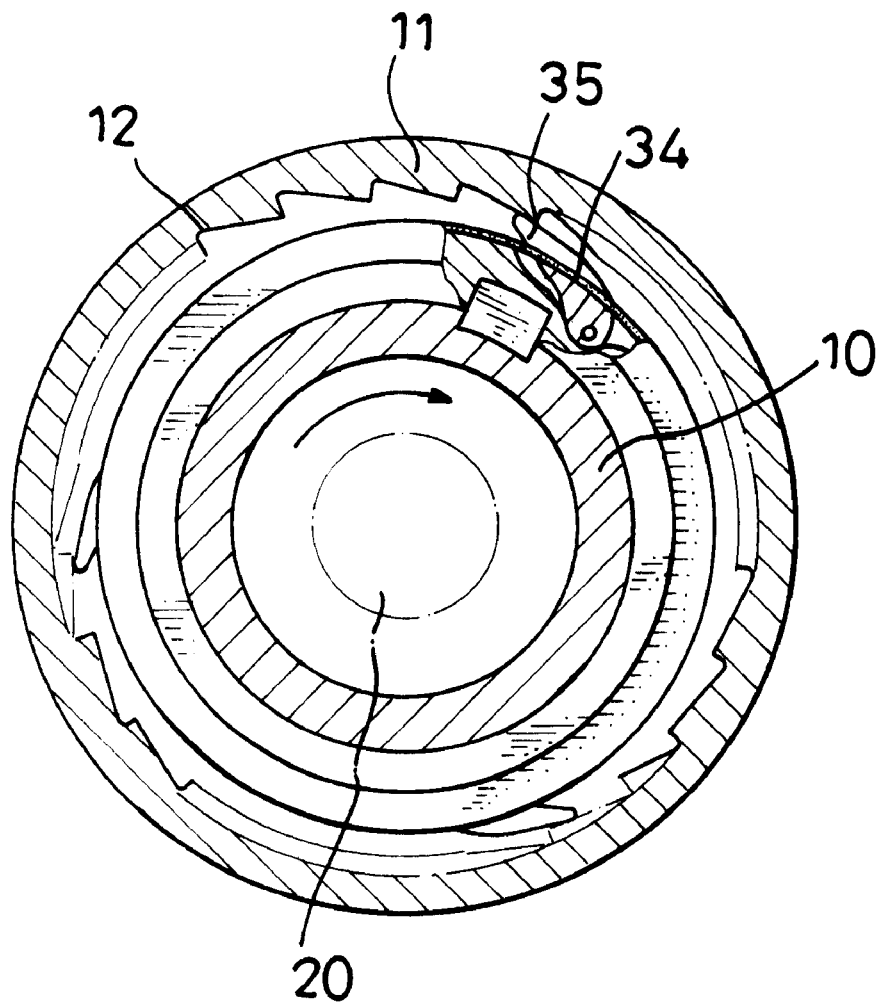
FIG. 5 is a side elevational view, partly in section, of the first unidirectional means to disengage the rotatable tube from the annular gear when the crank axle is rotated by the rider.

As shown in FIG. 5, when the motor (51) stops and the rider rotates the cranks (25) by his/her feet, the rotatable tube (10) is rotated with the crank axle (20) and the pawls (35) will slide over the notches (12) in the inside of the annular gear (11). Therefore, the rider may use the motor (51) to drive the bicycle while his/her feet do not need to rotate, or use his/her feet to rotate the cranks (25) as the action taken when riding an ordinary bicycle.

Although the invention has been explained in relation to its preferred embodiment, it is to be understood that many other possible modifications and variations can be made without departing from the spirit and scope of the invention as hereinafter claimed.

What is claimed is:

1. An electric drive device for a bicycle, comprising:
   a motor (51) having a drive shaft (510) extending therefrom and a first gear (52) mounted to said shaft (510);
   a speed reduction device (50) having an output shaft (501) and a second gear (53) bevel gear (54) connected to the distal end of said output shaft (501);
   a rotatable tube (10) adapted to extend through a bottom bracket (60) of the bicycle, a crank axle (20) rotatably extending through said rotatable tube (10) and having a threaded section (22);
   an annular gear (11) mounted to said rotatable tube (10) and a first unidirectional means (30) connected between said rotatable tube (10) and said annular gear (11), said annular gear (11) engaged with said bevel gear (54) and having a plurality of notches (12) defined in the inside thereof, said first unidirectional means (30) having a socket (33) provided with a plurality of recesses (31) defined radially in an outside thereof and pawls (35) respectively and pivotally received in said recesses (31) to pivotally connect to the outside thereof and to disengagably engage with said notches (12), and
   a second unidirectional means (40) connected between said crank axle (20) and said rotatable tube (10) and engaged with the threaded section (22) of the crank axle (20), said crank axle (20) disengaged with said rotatable tube (10) by said second unidirectional means (40) when said rotatable tube (10) is rotated by said first unidirectional means (30).

2. The drive device as claimed in claim 1, wherein the first end of each pawl (35) is pivotally engaged with said recess (31) corresponding thereto and the second end of pawl (35) has a slit (352) defined longitudinally therein, a circular ring (34) mounted to said socket (33) and received in said slit (352) of each pawl (35).

3. The drive device as claimed in claim 1, wherein said crank axle (20) has a threaded section (22) to which said second unidirectional means (40) is engaged.

4. The drive device as claimed in claim 1, wherein said rotatable tube (10) has at least one sprocket mounted thereto.

* * * * *